(12) United States Patent
Miyakawa

(10) Patent No.: US 6,654,182 B2
(45) Date of Patent: Nov. 25, 2003

(54) LENS BARREL AND OPTICAL APPARATUS WITH LENS BARREL

(75) Inventor: Masae Miyakawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 09/994,778

(22) Filed: Nov. 28, 2001

(65) Prior Publication Data

US 2002/0067556 A1 Jun. 6, 2002

(30) Foreign Application Priority Data

Dec. 5, 2000 (JP) .................................... 2000-370052

(51) Int. Cl.[7] ................................................ G02B 7/10
(52) U.S. Cl. ...................... 359/704; 359/694; 359/703; 359/823; 359/826
(58) Field of Search ............................... 359/694, 696, 359/697, 703, 823, 704, 826

(56) References Cited

U.S. PATENT DOCUMENTS

| | | | |
|---|---|---|---|
| 5,177,638 A | | 1/1993 | Emura et al. ............... 359/704 |
| 5,363,248 A | * | 11/1994 | Horio .......................... 359/704 |
| 5,774,280 A | * | 6/1998 | Miyauchi et al. ........... 359/819 |
| 5,895,129 A | * | 4/1999 | Ohta ............................ 396/79 |
| 6,292,308 B1 | * | 9/2001 | Tsuzuki et al. ............. 359/704 |
| 6,327,103 B1 | * | 12/2001 | Belliveau et al. ........... 359/819 |

* cited by examiner

Primary Examiner—Scott J. Sugarman
Assistant Examiner—Deborah A. Raizen
(74) Attorney, Agent, or Firm—Fitzpatrick, Cella, Harper & Scinto

(57) ABSTRACT

Lens barrel or an optical apparatus with a lens barrel comprising: a lens unit having an optical axis and forming an optical image, the lens unit having a fixed lens component and a movable lens component; and a lens housing for containing the lens unit, the lens housing having a first housing and a second housing divided in a direction along the optical axis; wherein: the first housing has a lens-holding portion for holding the fixed lens component; and the second housing has a pickup-device holding portion for holding an image pickup device for taking the optical image obtained by the lens unit.

28 Claims, 12 Drawing Sheets

LENS BARREL AND OPTICAL APPARATUS WITH LENS BARREL

BACKGROUND OF THE INVENTION

1. Field of the Invention

The present invention relates to a lens barrel used for a zoom lens and the like, and to an optical apparatus with a lens barrel such as a video camera.

2. Description of the Prior Art

An example of a prior art zoom lens for a video camera comprises the following four lens components: a fixed positive lens component, a movable negative lens component, a fixed positive lens component, and a movable positive lens component, which are disposed in this order starting from the object side. However, zoom lenses of other various configurations are also known.

FIG. 12(A) and FIG. 12(B) are diagrams showing the configuration of a zoom lens barrel according to the prior art. The zoom lens comprises the following four lens components 201a–201d: a fixed front lens component 201a; a variator lens component 201b for moving along the optical axis and thereby varying power; a fixed afocal lens component 201c; and a focusing lens component 201d for moving along the optical axis and thereby performing focal plane maintenance and focusing at power variation.

The front lens 201a is held in a front lens barrel 202. The variator lens component 201b is held in a variator moving ring 211. The afocal lens component 201c is held in a middle frame 215. The focusing lens component 201d is held in a focus moving ring 214.

The focus moving ring 214 is supported by guide shafts 204a and 204b which are engaged in the holes of a rear barrel 216 and in the holes of the middle frame 215 positioned by the rear barrel 216, whereby the focus moving ring 214 can move forward and backward in the direction of the optical axis.

The front lens barrel 202 is fixed on the rear barrel 216. A guide shaft 203 and a guide screw shaft 208 are supported between the front lens barrel 202 and the rear barrel 216, whereby the variator moving ring 211 is supported such as to be movable forward and backward in the direction of the optical axis. Further, the front lens barrel 202, the middle frame 215, and the rear barrel 216 constitute the outer shape of a substantially sealed lens barrel.

More detailed configurations are as follows. The guide bar 203, 204a, and 204b are disposed parallel to the optical axis 205, and thereby guides the movable lens components and prevents the rotation thereof. A DC motor 206 is a driver for driving the variator lens component 201b. In the figure, the DC motor is used as the driver for the variator lens component. However, a step motor may be used instead, similar to the driver for driving the focusing lens component as described later.

The variator lens component 201b is held in the variator moving ring 211. The variator moving ring 211 has: a press spring 209; and a ball 210 engaged in a screw groove 208a formed in a screwed shaft 208, by a force from the press spring 209. When the motor drives and revolves the screwed shaft 208 via an output shaft 206a and a gear series 207, the variator moving ring 211 moves along the guide shaft 203 in the direction of the optical axis.

The focusing lens component 201d is held in the focus moving ring 214. A sleeve portion (a portion engaged in the guide shaft and thereby forming a guiding portion) in the focus moving ring 214 is provided with a screw member 213 in the form of a single piece. When a step motor 212 is energized and an output shaft 212a thereof revolves, the screw portion formed in the output shaft 212a and the screw portion formed in the screw member 213 work together in linkage with the revolution, whereby the focus moving ring 214 moves along the guide shafts 204a and 204b in the direction of the optical axis.

As described above, such a linkage mechanism with the step motor may be used also in the variator driving mechanism.

In a case where the lens component is moved by such a step motor, when a photo-interrupter (not shown) is provided in order to detect the absolute position of the movable lens component in the direction of the optical axis, and when light blocking wall are provided in the moving ring in the form of a single piece, a reference position of the moving frame in the direction of the optical axis can be detected. After the holding frame is positioned at the reference position, the number of driving steps supplied to the step motor is counted continuously. As such, a position detecting means is obtained for detecting the absolute position of the holding frame.

FIG. 13 is a block diagram showing the electrical configuration of the camera body of an imaging apparatus according to the prior art. In the figure, identical numerals to FIG. 12 indicate identical components having the same function.

Numeral 221 indicates a solid state image device such as a CCD. Numeral 222 indicates a driver for a variator lens component 201b. This includes: a motor 206; a gear series 207 and a screwed shaft 208 in linkage with the motor 206; and the like as shown in FIG. 12. This driver is composed of a step motor or the like similar to the driver for the focusing lens component as shown in FIG. 12. Numeral 223 indicates a driver for a focusing lens component 201d. This includes: a step motor 212; a male-screwed output shaft 212a thereof; a screw member 213 formed in a focus moving ring 214; and the like.

Numeral 224 indicates an iris driver. Numeral 225 indicates a zoom encoder, while numeral 227 indicates a focus encoder. These encoders detect the absolute positions of the variator lens and the focusing lens component, respectively, in the direction of the optical axis. In a case where a DC motor (not shown in FIG. 13) is used in the driver for the variator lens similar to the case of FIG. 12, an absolute position encoder such as a variable resistor may be used. Alternatively, a magnetic absolute position encoder may be used.

In a case where a step motor Is used in the driver, generally used is the above-mentioned method wherein the holding frame is positioned at a reference position at first, and that the number of pulses inputted into the step motor is counted continuously.

Numeral 226 indicates an iris encoder. In an example of this encoder, a Hall device is provided inside a meter serving as an iris driver, whereby the relative rotational position is detected between the rotor and the stator.

Numeral 228 indicates a camera signal processing circuit for performing predetermined amplification and gamma correction for the CCD output. The contrast signal of the video signal that undergoes these predetermined processes is provided to an AE gate 229 and an AF gate 230. In these gates, the regions of signal extraction for exposure determination and focusing are set at an optimum within the field of view. The size of each gated region may be variable.

Alternatively, a plurality of regions may be used in each gate. However, a detailed description is omitted for simplicity.

Numeral 231 indicates an AF signal processing circuit for automatic focusing (AF), which generates output signal(s) with respect to high frequency components of the video signal. Numeral 233 indicates a zoom switch. Numeral 234 indicates a zoom tracking memory for storing the information on the focusing lens position to be adopted depending on the object distance and the variator lens position at power variation. The zoom tracking memory may be implemented by a memory in a CPU. Numeral 232 indicates a CPU.

In the above-mentioned configuration, for example, when the zoom switch 233 is operated by a user, in order to maintain a predetermined positional relation between the variator lens and the focusing lens calculated on the basis of the information stored in the zoom tracking memory 234, the CPU 232 controls the driving of the zoom driver 222 and the focusing driver 223 so that the present absolute position of the variator lens in the direction of the optical axis detected by the zoom encoder 225 coincides with the calculated optimum position for the variator lens, and that the present absolute position of the focusing lens in the direction of the optical axis detected by the focus encoder 227 coincides with the calculated optimum position for the focusing lens, respectively.

At automatic focusing operation, the CPU 232 controls the driving of the focusing driver 223 so that the output of the AF signal processing circuit 231 is at peak. For the purpose of optimum exposure, the CPU 232 controls the driving of the iris driver 224 and thereby controls the aperture size in a manner where the average of the Y signal output from the AE gate 229 becomes a predetermined value, and where the output of the iris encoder 226 becomes the predetermined value.

As described above, a lens barrel according to the prior art has been composed of: a fixed positive lens component held in a fixed barrel; a movable negative lens component supported by two guide shafts such as to be movable forward and backward in the direction of the optical axis; a fixed positive lens component held in a middle frame; a movable positive lens component supported by two guide shafts such as to be movable forward and backward in the direction of the optical axis; and a CCD at a final image plane held in a rear barrel; which are disposed in this order starting from the object side. Further, the movable negative lens component and the movable positive lens component have been enclosed in the fixed barrel and the rear barrel, respectively. And, a substantially sealed lens barrel structure has been formed by the fixed barrel, the middle frame, and the rear barrel, or alternatively by the fixed barrel and the rear barrel.

In recent years, size reduction and diameter reduction have been demanded in picture lenses. Nevertheless, in particular, when the outer diameter of the fixed barrel is reduced, an inner wall reflection ghost occurred in which reflected light from the inner wall of the barrel reaches the image plane.

This has created a requirement for a light blocking means such as light blocking lines in the inner wall of the fixed barrel. Nevertheless, in a lens barrel configuration according to the prior art, when light blocking lines are provided in the inner wall of the fixed barrel, the mold used for molding the lens barrel becomes complicated. For example, the mold configuration becomes a very complicated one in which the molding is carried out after the light blocking portion is slid inward. This has created a problem of an expensive and non-durable mold. Further, the method has been applicable only to lens barrels of a larger inner diameter, and hence not applicable to fixed barrels of a reduced size. These problems have prevented the size reduction of lens barrels.

Thus, in order for the light blocking lines to be easily molded, a box-shaped lens barrel configuration in which one side surface of a box-shaped lens barrel body is set to be an opening surface, and in which movable lens components are built-in by passing through the opening and then the lens barrel is sealed with a cover is proposed. Nevertheless, in a case of such a box-shaped lens barrel, from the viewpoint of easy assembling, support for the guide shafts for positioning and supporting the movable lens components and the middle frame requires a semicircular shape facing the opening surface. Accordingly, the guide shafts need to be fixed with the cover. Nevertheless, insufficient rigidity of the cover material has caused an instability in the fixture of the guide shafts. This, in turn, has caused pickup of drive motor vibrations and resonance with it, and thereby an exacerbation in acoustic noise and the like.

SUMMARY OF THE INVENTION

An object of the invention is to provide a lens barrel in which enclosed movable lens component frames and fixed lens component frames are assembled more easily, and in which guide shafts are stably fixed for positioning and supporting the movable lens components and the fixed lens components in a manner in that the movable lens components are movable in the direction of the optical axis.

In order to achieve the above-mentioned object, an aspect of the invention is a lens barrel comprising:

a lens unit having an optical axis and forming an optical image, said lens unit having a fixed lens component and a movable lens component; and a lens housing for containing said lens unit, said lens housing having a first housing and a second housing divided in a direction along said optical axis.

Another aspect of the invention is a lens barrel comprising:

a lens unit having an optical axis and forming an optical image, said lens unit having: a plurality of fixed lens components including a front fixed lens component disposed on the most object side; and a plurality of movable lens components; and a lens housing for containing said lens unit, said lens housing having a first housing and a second housing divided in a direction along said optical axis; wherein:

in the front portion of said first housing, said first housing has a flange into which said front fixed lens component is fixed;

inside said first housing, said first housing has a lens-holding portion for holding said fixed lens component other than said front fixed lens component; and said second housing has a pickup-device holding portion for holding an image pickup device for taking said optical image obtained by said lens unit.

Another aspect of the invention is a lens barrel comprising:

a lens unit having an optical axis and imaging an optical image, said lens unit having: a plurality of fixed lens components including a front fixed lens component disposed on the most object side; a plurality of movable lens components; and a guide bar for guiding said movable lens components and for positioning said fixed lens component other than said front fixed lens component;

a lens housing for containing said lens unit, said lens housing having a first housing and a second housing divided in a direction along said optical axis; wherein:

in the front portion of said first housing, said first housing has a flange into which said front fixed lens component is fixed;

inside said first housing, said first housing has: a first guide-bar supporting portion for supporting said guide bar: and a lens-holding portion for holding said fixed lens component other than said front fixed lens component; and said second housing has: a second guide-bar supporting portion for supporting said guide bar; and a pickup-device holding portion for hoding an image pickup device for taking said optical image obtained by said lens unit.

Another aspect of the invention is an optical apparatus with a lens barrel comprising:

a lens unit having an optical axis and forming an optical image, said lens unit having a fixed lens component and a movable lens component;

an image pickup device for taking said optical image obtained by said lens unit; and a lens housing for containing said lens unit, said lens housing having a first housing and a second housing divided in a direction along said optical axis; wherein:

said first housing has a lens-holding portion for holding said fixed lens component; and said second housing has a pickup-device holding portion for holding said image pickup device.

Another aspect of the invention is an optical apparatus with a lens barrel comprising:

a lens unit having an optical axis and forming an optical image, said lens unit having: a plurality of fixed lens components including a front fixed lens component disposed on the most object side; and a plurality of movable lens components;

an image pickup device for taking said optical image obtained by said lens unit; and a lens housing for containing said lens unit, said lens housing having a first housing and a second housing divided in a direction along said optical axis; wherein:

in the front portion of said first housing, said first housing has a flange into which said front fixed lens component is fixed;

inside said first housing, said first housing has a lens-holding portion for holding said fixed lens component other than said front fixed lens component; and said second housing has a pickup-device holding portion for holding said image pickup device.

Another aspect of the invention is an optical apparatus comprising:

a lens unit having an optical axis and forming an optical image, said lens unit having: a plurality of fixed lens components including a front fixed lens component disposed on the most object side; a plurality of movable lens components; and a guide bar for guiding said movable lens components and for positioning said fixed lens component other than said front fixed lens component;

an image pickup device for taking said optical image obtained by said lens unit; and a lens housing for containing said lens unit, said lens housing having a first housing and a second housing divided in a direction along said optical axis; wherein:

in the front portion of said first housing, said first housing has a flange into which said front fixed lens component is fixed;

inside said first housing, said first housing has: a first guide-bar supporting portion for supporting said guide bar; and a lens-holding portion for holding said fixed lens component other than said front fixed lens component; and said second housing has: a second guide-bar supporting portion for supporting said guide bar; and a pickup-device holding portion for holding said image pickup device.

Further objects and configurations of the invention are clearly disclosed in the following description of the embodiments.

BRIEF DESCRIPTION OF THE DRAWINGS

FIG. 11(A) is a vertical cross sectional view of a zoom lens driving mechanism according to the prior art.

FIG. 11(B) is a vertical cross sectional view of a zoom lens driving mechanism according to Embodiment 2.

DETAILED DESCRIPTION OF THE INVENTION (First Embodient)

Figure 1:
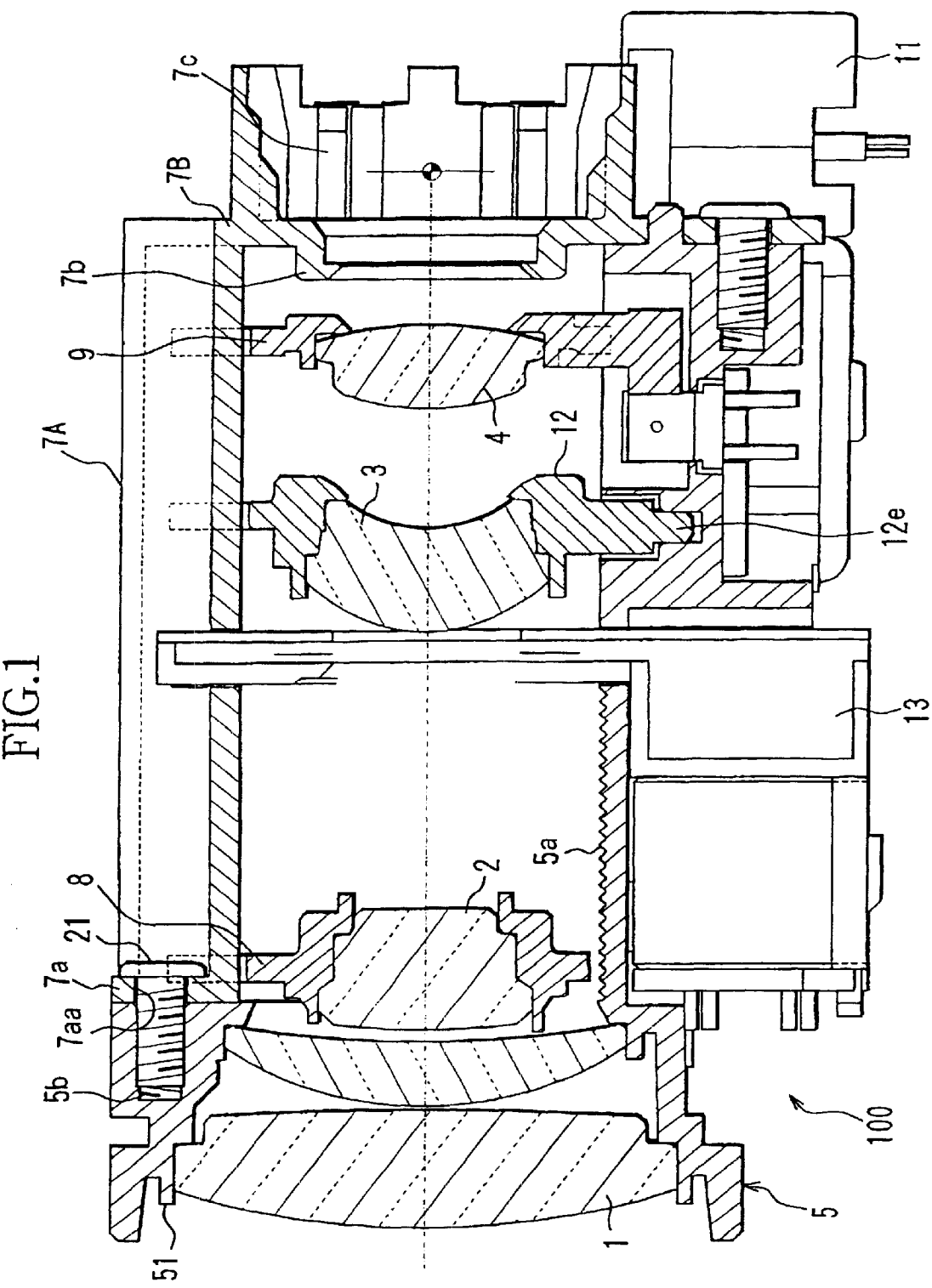
FIG. 1 is a vertical cross sectional view of a zoom lens according to Embodiment 1 of the invention.
Figure 2:
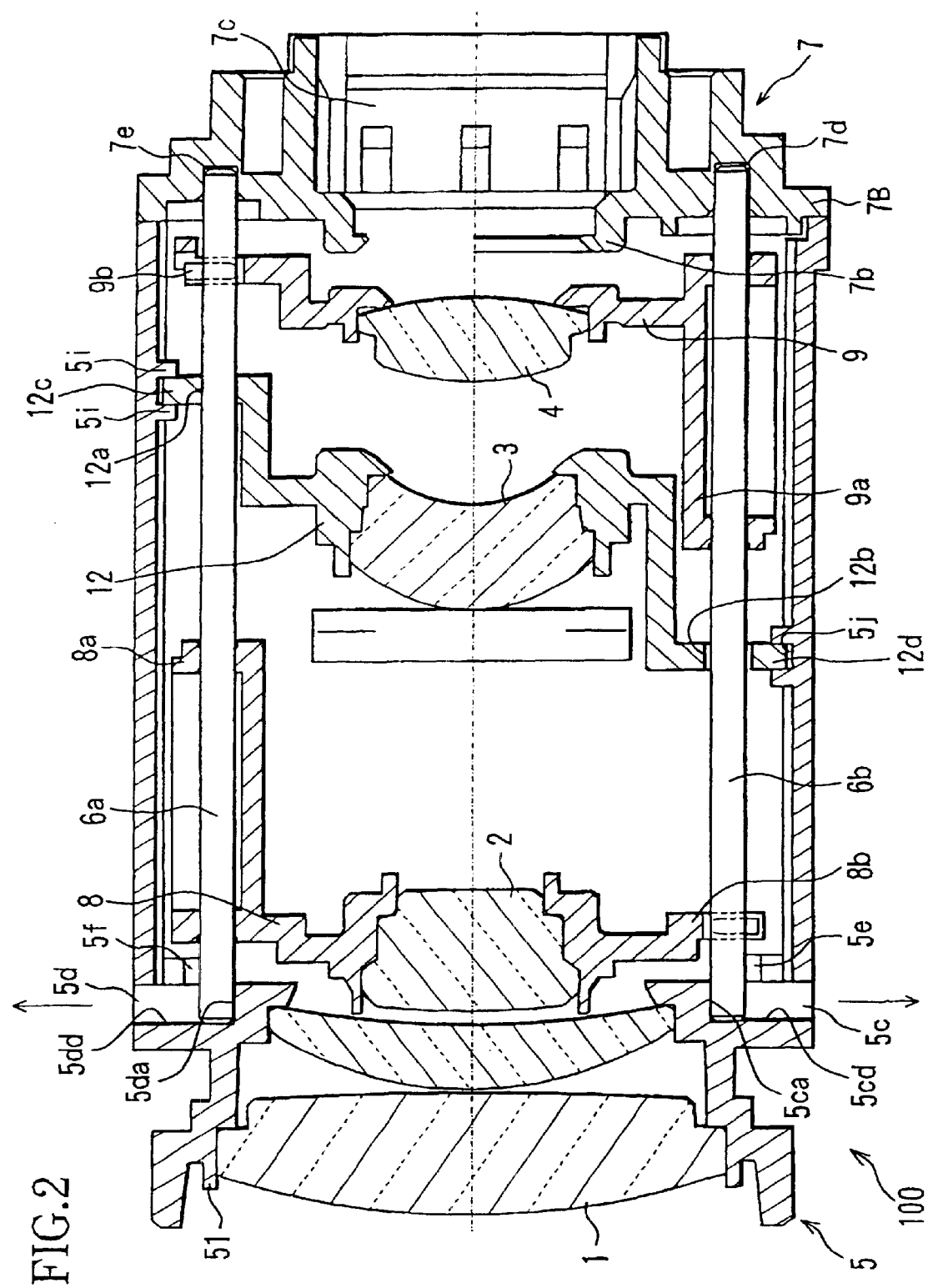
FIG. 2 is a horizontal cross sectional view of a zoom lens according to Embodiment 1 of the invention.

FIG. 1 is a vertical cross sectional view showing the configuration of a zoom lens barrel serving as a lens housing according to the first embodiment of the invention. FIG. 2 is a horizontal cross sectional view thereof.

In the figures, numeral 1 indicates a first lens component serving as a front lens. Numeral 2 indicates a variator lens component. Numeral 3 indicates a fixed afocal lens component. Numeral 4 indicates a focusing lens component.

Figure 3:
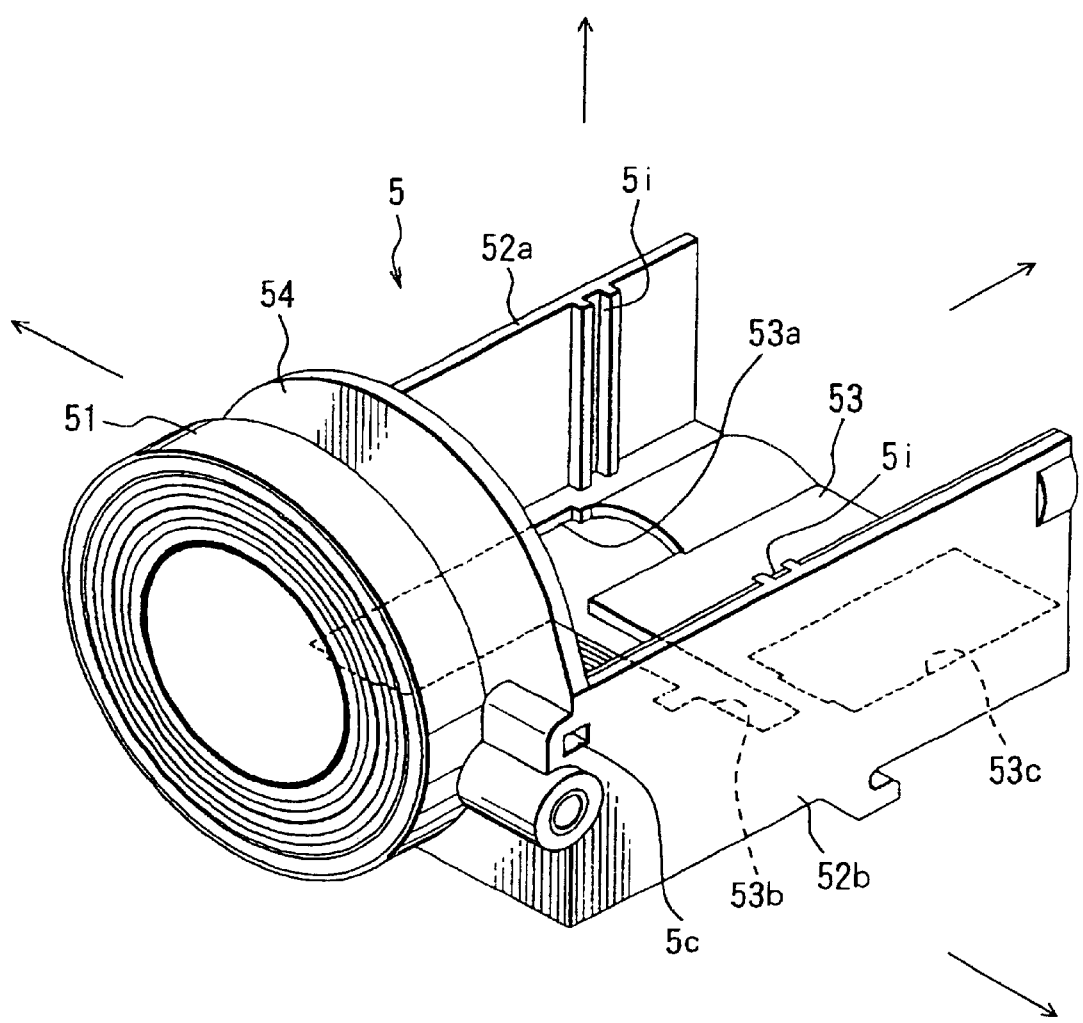
FIG. 3 is a perspective view of a front lens barrel according to Embodiment 1 of the invention.

Numeral 5 indicates a front lens barrel which holds the first lens component and serves as a divided housing. As shown in FIG. 3, the front lens barrel is substantially box-shaped, and provided with: a flange portion 51 for holding the first lens component in the front surface; and right and left side surfaces 52a and 52b and a bottom surface 53 each formed along the direction of the optical axis. The side surface 52a is provided with an engaging groove 5i described later. The side surface 52b is provided with an engaging groove 5j described later. The bottom surface 53 is provided with: an attachment hole 53a for attaching a power zoom (PZ) motor 10 described later; an attachment hole 53b for attaching an iris galvano (IG) meter 13 which constitutes an iris unit serving as a light amount control unit; and an attachment hole 53c for attaching an automatic-focus (AF) motor 11.

The inner wall bottom surface of the front lens barrel 5 is provided with light blocking lines 5a which have stain-finished surfaces and serve as a blocking section for blocking the reflection of unnecessary light. This avoids inner wall reflection and hence prevents undesired reflection ghosts.

The light blocking lines 5a are formed by a slide mold (not shown) sliding upward as shown by an upward arrow in FIG. 3. The shape of the inner wall of the front lens barrel 5 is such that all portions requiring dimensional precision can be formed by a slide mold (not shown) sliding upward.

As shown in FIG. 2, the front lens barrel 5 is provided with an unthreaded hole 5b for a fixture screw 21 for fixing a rear barrel 7 described later. The unthreaded hole 5b is formed by an inner slide mold (not shown) sliding horizontally within the above-mentioned slide mold (not shown) sliding upward.

Figure 4:
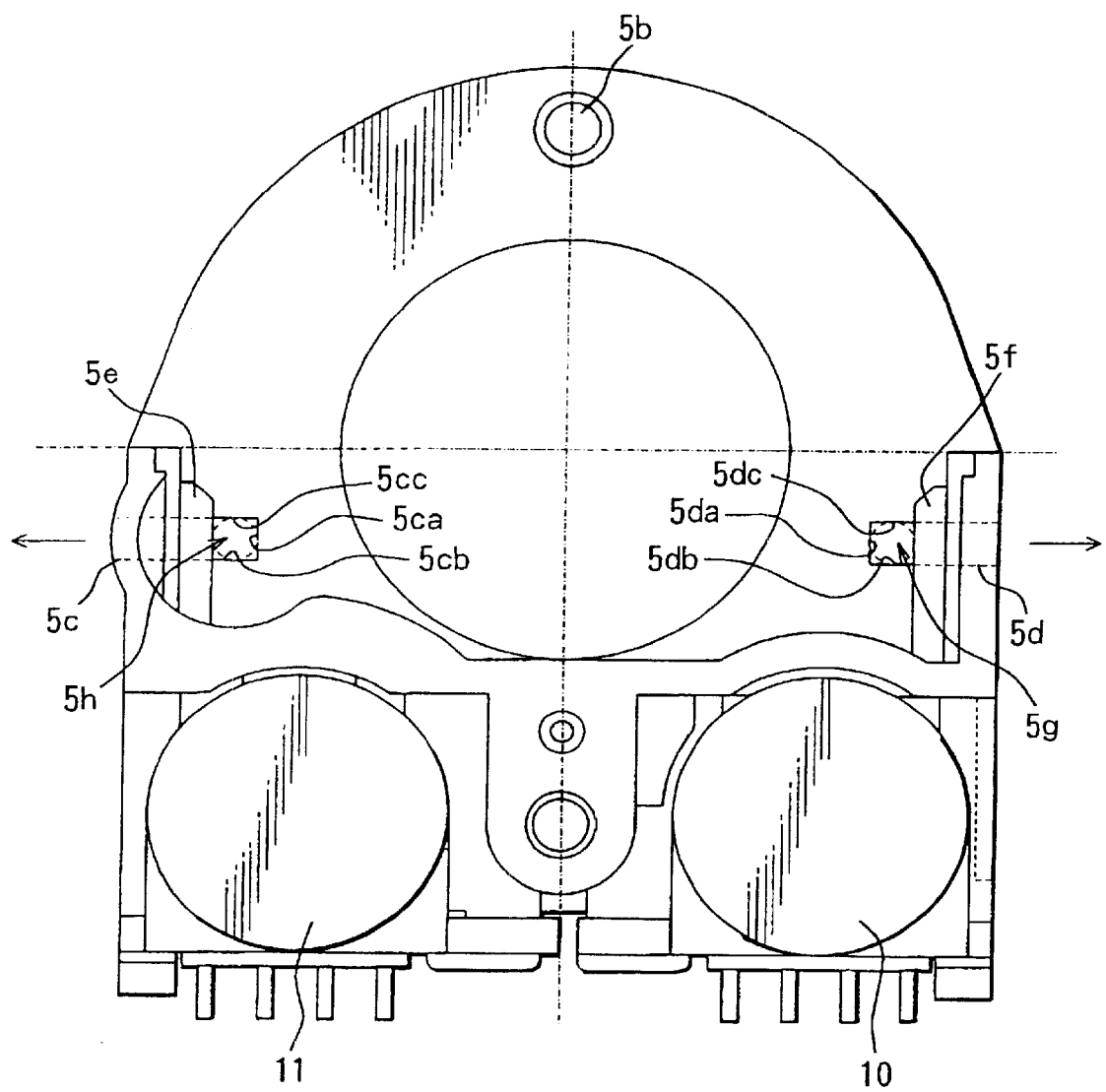
FIG. 4 is a rear view of a front lens barrel according to Embodiment 1 of the invention.

As shown in FIG. 2, FIG. 3 and in FIG. 4 a rear view of the front lens barrel 5 viewed from the rear side toward the front side, slide holes 5c and 5d in the right and left directions are formed in the front wall 54 of the front lens barrel 5 by a slide mold (not shown) sliding in the right and left directions. Each of the right and left slide holes 5c and 5d comprises the following four walls: a vertical side wall (forefront wall of the groove) 5ca or 5da formed on the optical axis center side; top and bottom walls 5cb and 5cc or 5db and 5dc opposing each other in the up-down direction; and a front wall 5cd or 5dd.

Each rib 5e or 5f is formed in the front lens barrel 5 in the position departing from the vertical side wall 5ca and 5da of each slide hole 5c and 5d toward the direction departing from the optical axis center by the amount of the diameter of a guide shaft 6a and 6b described later, by means of a slide mold (not shown) sliding upward. Each rib 5e and 5f and the walls 5ca –5cd and 5da–5dd of each slide hole 5c or 5d constitute a guide support hole 5g and 5h for supporting the front end of the guide shaft 6a and 6b.

Figure 5:
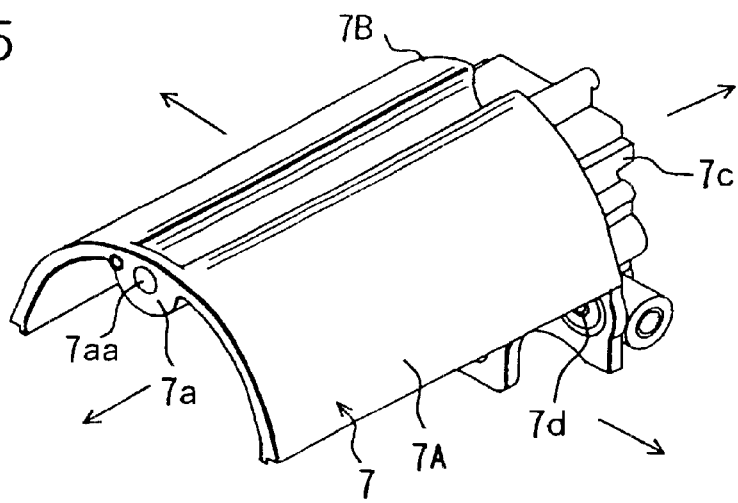
FIG. 5 is a perspective view of a rear barrel according to Embodiment 1 of the invention.
Figure 6:
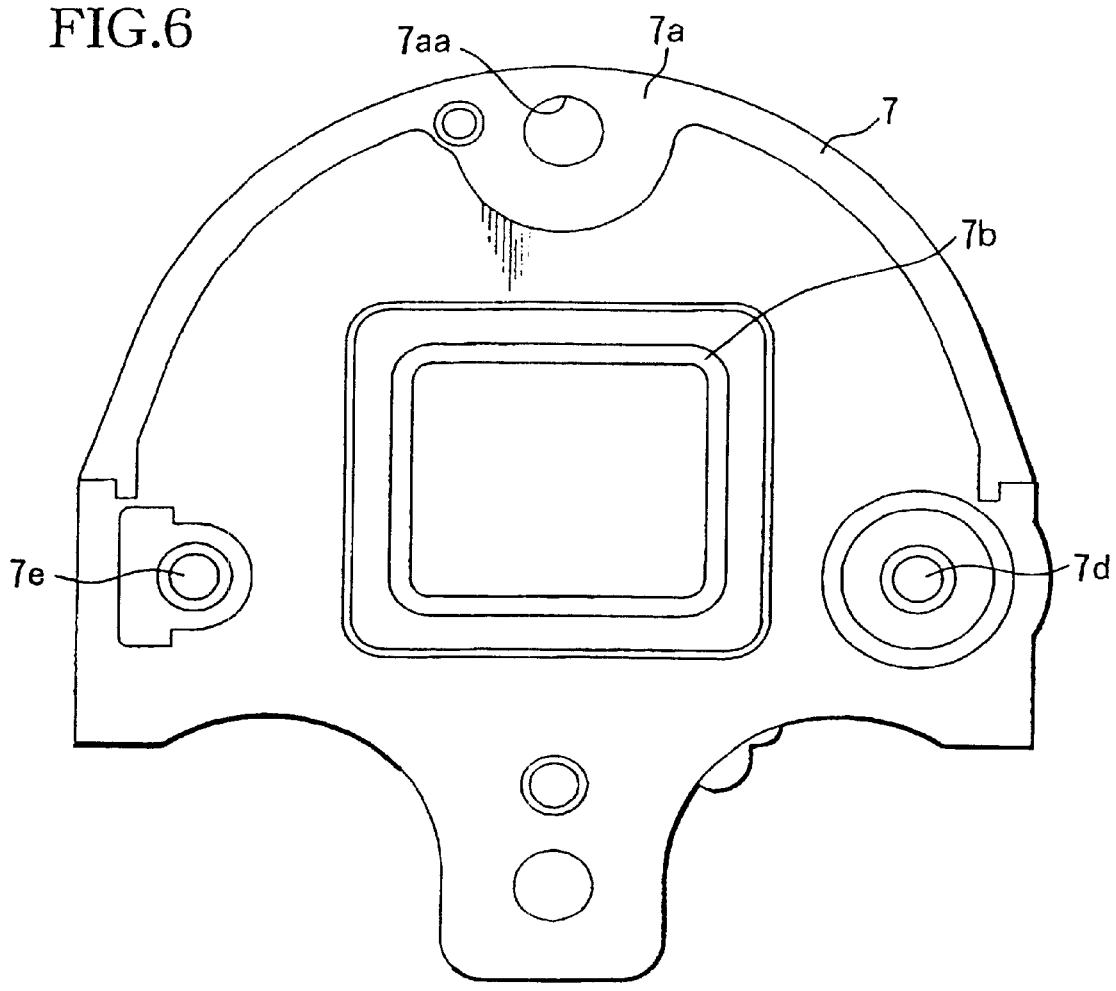
FIG. 6 is a front view of a rear barrel according to Embodiment 1 of the invention.

As shown in FIG. 5, a rear end wall section 7B is formed in the rear barrel 7 serving as a divided housing, in the form of a single piece on the rear end side of the top surface 7A having the shape of a substantially semi-cylindrical roof. The rear end wall section 7B is provided with: a low-pass-filter holding section 7b; and a CCD-holding section 7c for holding a CCD serving as an image pickup device. An abutted surface 7a abutted with the front lens barrel 5 is provided on the front end side of the top surface 7A of the rear barrel 7. The abutted surface 7a is provided with a hole 7aa through which the fixture screw 21 passes.

The rear barrel 7 is formed by injection molding using a slide mold (not shown) sliding in the four directions indicated by the arrows in the forward, backward, up and down directions shown in FIG. 5.

Accordingly, guide support holes 7d and 7e are provided for supporting the rear ends of the guide shafts 6a and 6b, respectively, in the rear end wall section 7B of the rear barrel 7. The guide support holes 7d and 7e are more easily formed with precision by a slide mold (not shown) sliding forward.

Since the above-mentioned rear barrel 7 is not provided with light blocking lines in the inner wall, the guide support holes 7d and 7e can be formed by the slide mold (not shown) sliding forward. However, in a case where the rear barrel 7 is provided with light blocking lines in the inner wall, the guide support holes 7d and 7e can be formed with precision by a slide mold (not shown) sliding downward within the slide mold (not shown) sliding forward.

The guide shafts 6a and 6b are engaged in the guide support holes 5g and 5h of the front lens barrel 5 and the guide support holes 7d and 7e of the rear barrel 7, respectively, thereby being positioned and supported. Further, the front lens barrel 5 and the rear barrel 7 each serving as divided housing are divided substantially along the direction of the optical axis. The front lens barrel 5 and the rear barrel 7 each serving as thus-divided housing are combined and constitute a lens housing 100.

Figure 7:
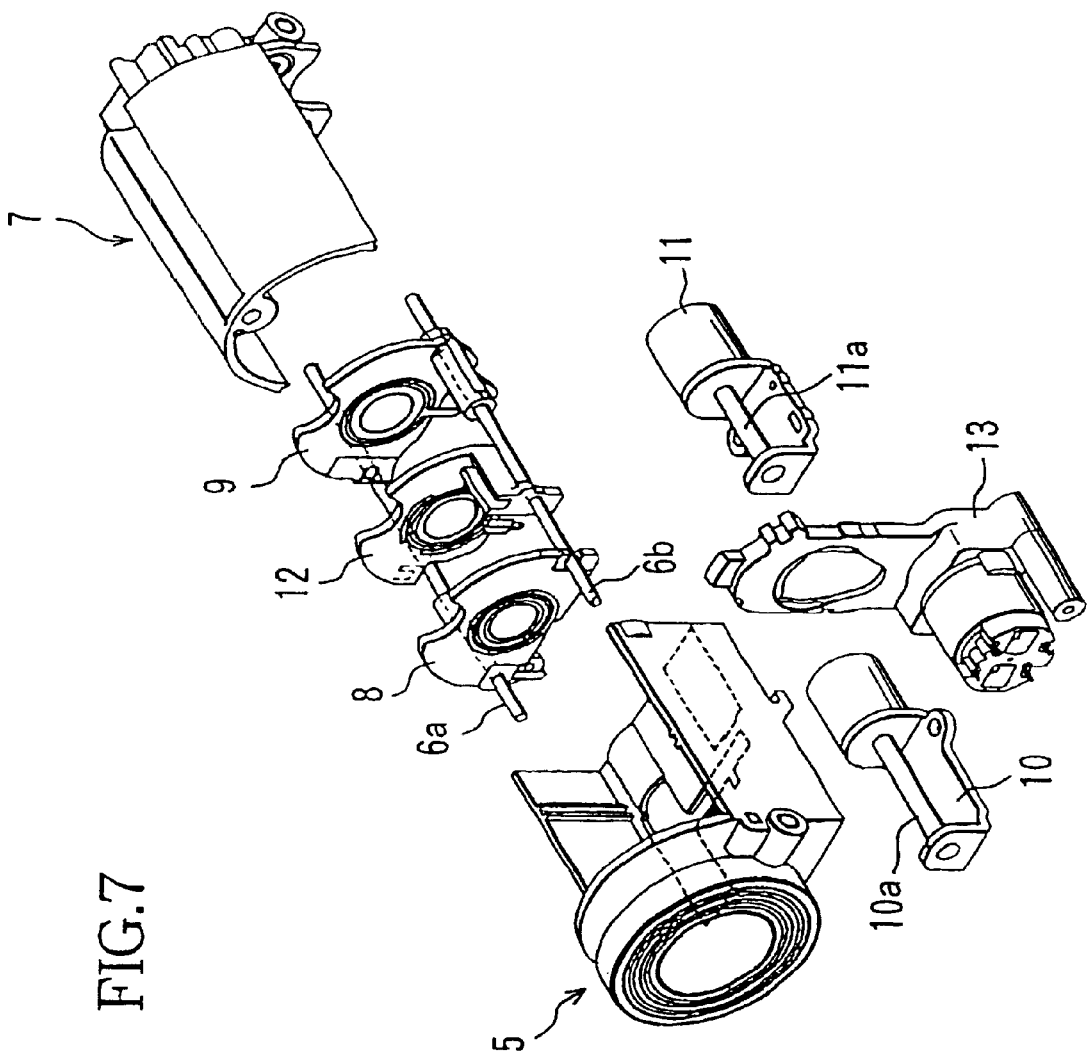
FIG. 7 is an exploded perspective view of Embodiment 1 of the invention.

As shown in FIG. 2, a variator moving ring 8 for holding the variator lens component 2 is provided with a sleeve 8a on the reference positioning side thereof. The guide shaft 6a passes through the sleeve 8a. The variator moving ring 8 is further provided with a U-channel section 8b on the center rest side thereof. The U-channel section 8b engages with the guide shaft 6b, whereby the optical axis is centered. The inclination (tilt) of the variator lens component 2 relative to the optical axis is secured by a long engagement length of the sleeve 8a. A rack gear (not shown) is attached to the variator moving ring 8 in a manner free from looseness in the direction of the optical axis but rotatable in the direction perpendicular to the optical axis. The rack gear engages with the screw shaft 10a of the PZ motor 10 as shown in FIG. 7. Accordingly, when the screw shaft revolves, the variator moving ring 8 moves forward and backward in the direction of the optical axis.

A focus moving ring 9 for holding the focusing lens component 4 is provided with a sleeve 9a on the reference positioning side thereof. The guide shaft 6b passes through the sleeve 9a. The focus moving ring 9 is further provided with a U-channel section 9b on the center rest side thereof. The U-channel section 9b engages with the guide shaft 6a, whereby the optical axis is centered.

The inclination (tilt) of the focusing lens component 4 relative to the direction of the optical axis is secured by a long engagement length of the sleeve 9a. Since the sleeves 8a and 9a respectively have the long engagement length, the guide shafts 6a and 6b are separately used for reference positioning of the variator moving ring 8 and focus moving ring 9. A rack gear (not shown) is attached to the focus moving ring 9 in a manner free from looseness in the direction of the optical axis but rotatable in the direction perpendicular to the optical axis. The rack gear engages with the screw shaft 11a of the AF motor 11 as shown in FIG. 7. Accordingly, when the screw shaft revolves, the focus moving ring 9 moves forward and backward in the direction of the optical axis.

Figure 8:
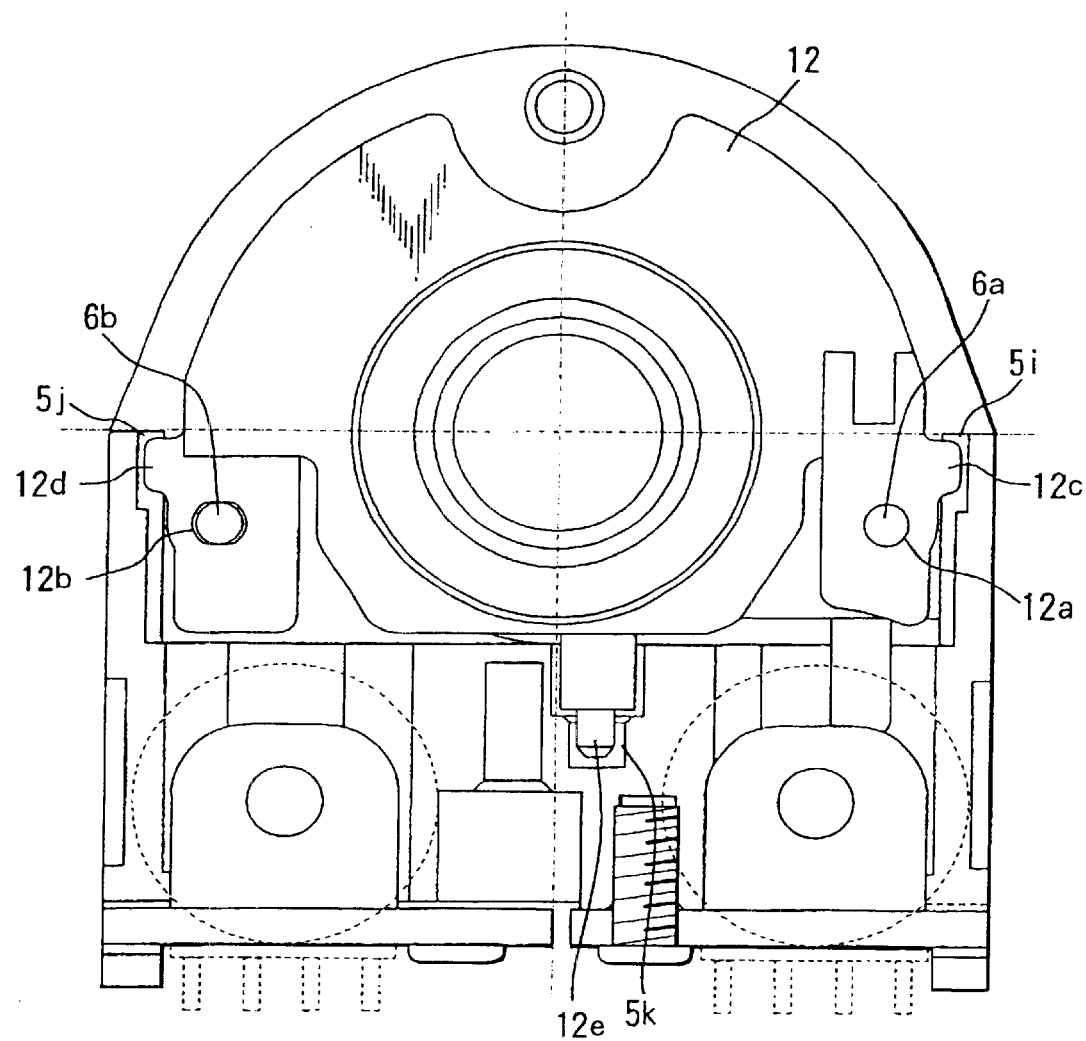
FIG. 8 is a front view of the engaged state between a middle frame and a front lens barrel according to Embodiment 1 of the invention.

As shown in the rear view in FIG. 8, similar to the variator moving ring 8 and the focus moving ring 9, a middle frame 12 for holodng the fixed afocal lens component 3 is provided with a reference-positioning hole 12a and a center-resting elongated hole 12b. These holes engage with the guide shafts 6a and 6b, respectively, whereby the optical axis is centered. In the variator moving ring 8 and the focus moving ring 9, the tilt of the lens components 2 and 4 is secured by the long engagement length of the sleeves 8a and 9a on the reference positioning side. Nevertheless, the sleeve length of the middle frame 12 is difficult to set long without the presence of the sleeves 8a and 9a of the moving lens components 2 and 4. Accordingly, in the present embodiment, the middle frame 12 is provided with three engaging sections 12c, 12d, and 12e for engaging with the front lens barrel 5, whereby the tilt of the afocal lens component 3 is secured. The engaging sections 12c, 12d, and 12e formed in the middle frame 12 engage with the engaging grooves 5i, 5j and the engaging elongated hole 5k, respectively, formed corresponding to the front lens barrel 5.

The engaging sections 12c and 12d of the middle frame 12 engage with the engaging grooves 5i and 5j of the front lens barrel 5, respectively, thereby determining the position of the middle frame 12 in the direction of the optical axis, and determining the tilt in the direction of the optical axis. Further, the engaging section 12e of the middle frame 12 engages with the engaging elongated hole 5k of the front lens barrel 5, whereby the position is determined in the direction of the optical axis. These engaging sections may be in a smooth engagement, or alternatively, in a slightly tight fit.

In the above-mentioned configuration, an example of the procedure of assembling a lens barrel is as follows.

The guide shafts 6a and 6b are assembled such as to pass through and thereby support the variator moving ring 8, the middle frame 12, and the focus moving ring 9. Then, the middle frame 12 is built into the front lens barrel 5 from the direction perpendicular to the optical axis (that is, from above). Further, the guide shafts 6a and 6b are inserted into the guide support holes 5g and 5h, respectively, of the front lens barrel 5 from the direction of the optical axis. The rear barrel 7 is built-in from the direction of the optical axis, and then fixed with the fixture screw 21. Thus, the outer shape of the housing 100 is completed.

After that, the PZ (power zoom) motor 10 and the AF (automatic focus) motor 11 each serving as an actuator, and the IG (iris galvano) meter 13 constituting an iris unit serving as a light-amount control unit are built-in from the direction perpendicular to the optical axis. Thus, a lens barrel unit is completed.

In another assembling procedure, the guide shafts 6a and 6b are firstly built into the rear barrel 7 in the direction of the optical axis. Then, the focus moving ring 9, the middle frame 12, and the variator moving ring 8 are built into the rear barrel 7 in this order in the direction of the optical axis. This inner assembly is then lowered relatively to the front lens barrel 5 from the direction perpendicular to the optical axis, until the middle frame 12 reaches the normal position thereof. After that, the rear barrel 7 is built-in by sliding it by the amount of the engagement length of the guide shafts 6a and 6b, whereby a lens barrel is completed. The subsequent procedures are the same as the above-mentioned one.

Figure 9:
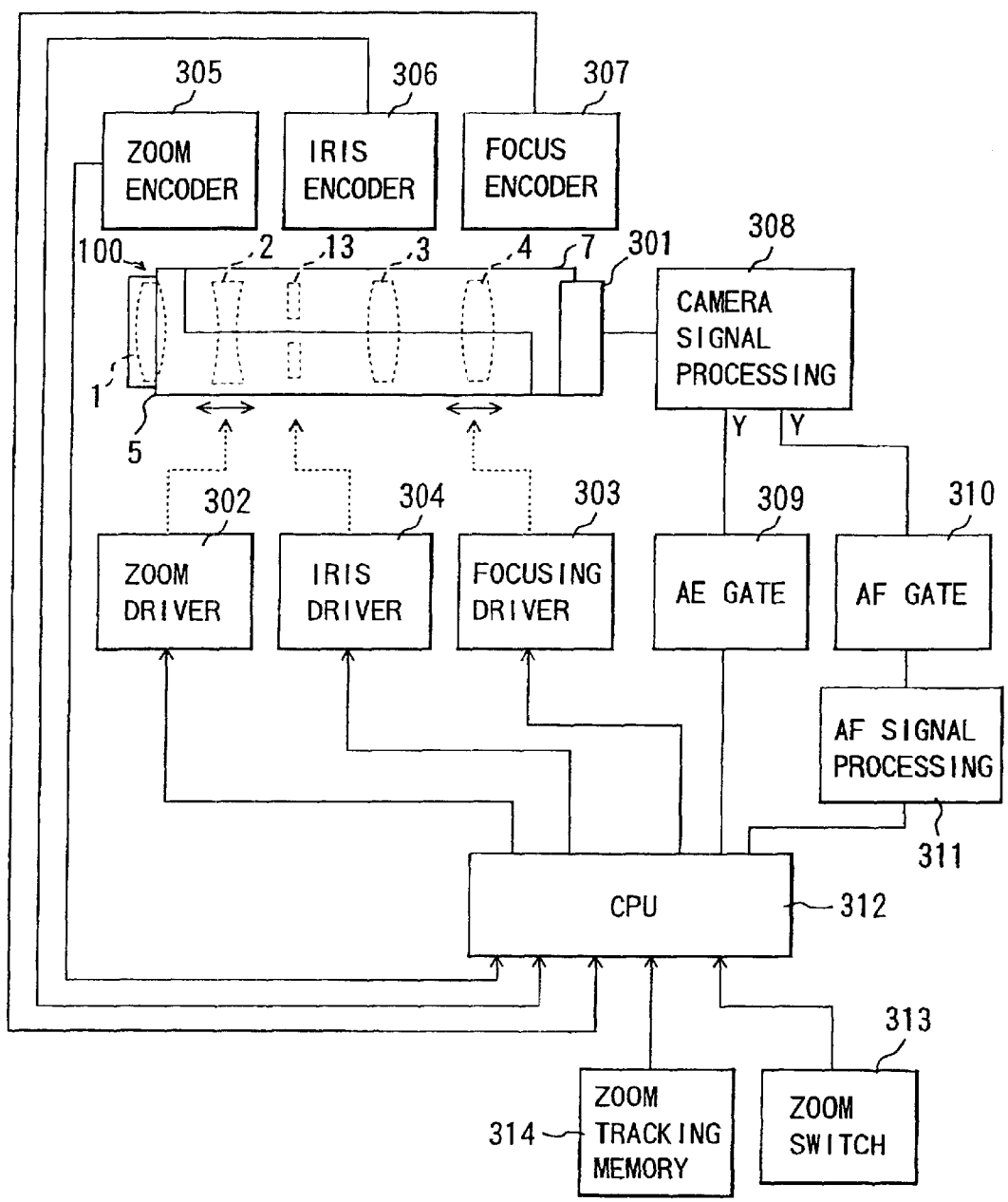
FIG. 9 is a block diagram showing an imaging apparatus using a lens housing according to Embodiment 1 of the invention.

A lens housing 100 having such a configuration is used in an image apparatus shown in FIG. 9. FIG. 9 is a block diagram showing the electrical configuration of the camera body of an imaging apparatus using the abovementioned lens housing 100. In the figure, identical numerals to the above-mentioned embodiment indicate identical components having the same function.

Numeral 301 indicates a solid state imaging device, such as a CCD, serving as an image pickup device. Numeral 302 indicates a driver for the variator lens component 2. This includes the PZ motor 10 shown in FIG. 7. The PZ motor 10 may be composed of a step motor and the like. Numeral 303 indicates a driver for the focusing lens component 4. This includes the AF motor 11 composed of a step motor shown in FIG. 7.

Numeral 304 indicates an iris driver. Numeral 305 indicates a zoom encoder, while numeral 307 indicates a focus encoder. These encoders detect the absolute positions of the variator lens component 2 and the focusing lens component 4, respectively, in the direction of the optical axis. In a case where a DC motor is used in the driver for the variator lens component 2, an absolute position encoder such as a variable resistor may be used. Alternatively, a magnetic absolute position encoder may be used.

In a case where a step motor is used in the driver, generally used is a method in which the number of pulses supplied to the step motor is counted continuously.

Numeral 306 indicates an iris encoder. In an example of this encoder, a Hall device is provided inside a meter serving as an iris driver, whereby the relative rotational position is detected between the rotor and the stator.

Numeral 308 indicates a camera signal processing circuit for performing predetermined amplification and gamma correction on the CCD 301 output. The contrast signal of the video signal having undergone these predetermined processes passes through an AE gate 309 and an AF gate 310. In these gates, the regions of signal extraction for exposure determination and focusing are set at an optimum within the field of view. The size of each gated region may be variable. Alternatively, a plurality of regions may be used in each gate. However, a detailed description is omitted for simplicity.

Numeral 311 indicates an AF signal processing circuit for automatic focusing (AF), which generates output signal(s) with respect to high frequency components of the video signal. Numeral 313 indicates a zoom switch. Numeral 314 indicates a zoom tracking memory for storing the information on the focusing lens position to be adopted depending on the object distance and the variator lens position at magnification variation. The zoom tracking memory may be implemented by a memory in a CPU. Numeral 312 indicates a CPU.

In the above-mentioned configuration, for example, when the zoom switch 313 is operated by a user, in order to maintain a predetermined positional relation between the variator lens component 2 and the focusing lens component 4 calculated on the basis of the information stored in the zoom tracking memory 314, the CPU 312 controls the driving of the zoom driver 302 and the focusing driver 303 so that the present absolute position of the variator lens component 2 in the direction of the optical axis detected by the zoom encoder 305 coincides with the calculated optimum position for the variator lens component 2, and that the present absolute position of the focusing lens component 4 in the direction of the optical axis detected by the focus encoder 307 coincides with the calculated optimum position for the focusing lens component 4.

At automatic focusing operation, the CPU 312 controls the driving of the focusing driver 303 so that the output of the AF signal processing circuit 311 is at peak. For the purpose of optimum exposure, the CPU 312 controls the driving of the iris driver 304 and thereby controls the aperture diameter in a manner that the average of the Y signal output from the AE gate 309 becomes a predetermined value, and where the output of the iris encoder 306 becomes the predetermined value.

(Second Embodiment)

Figure 10:
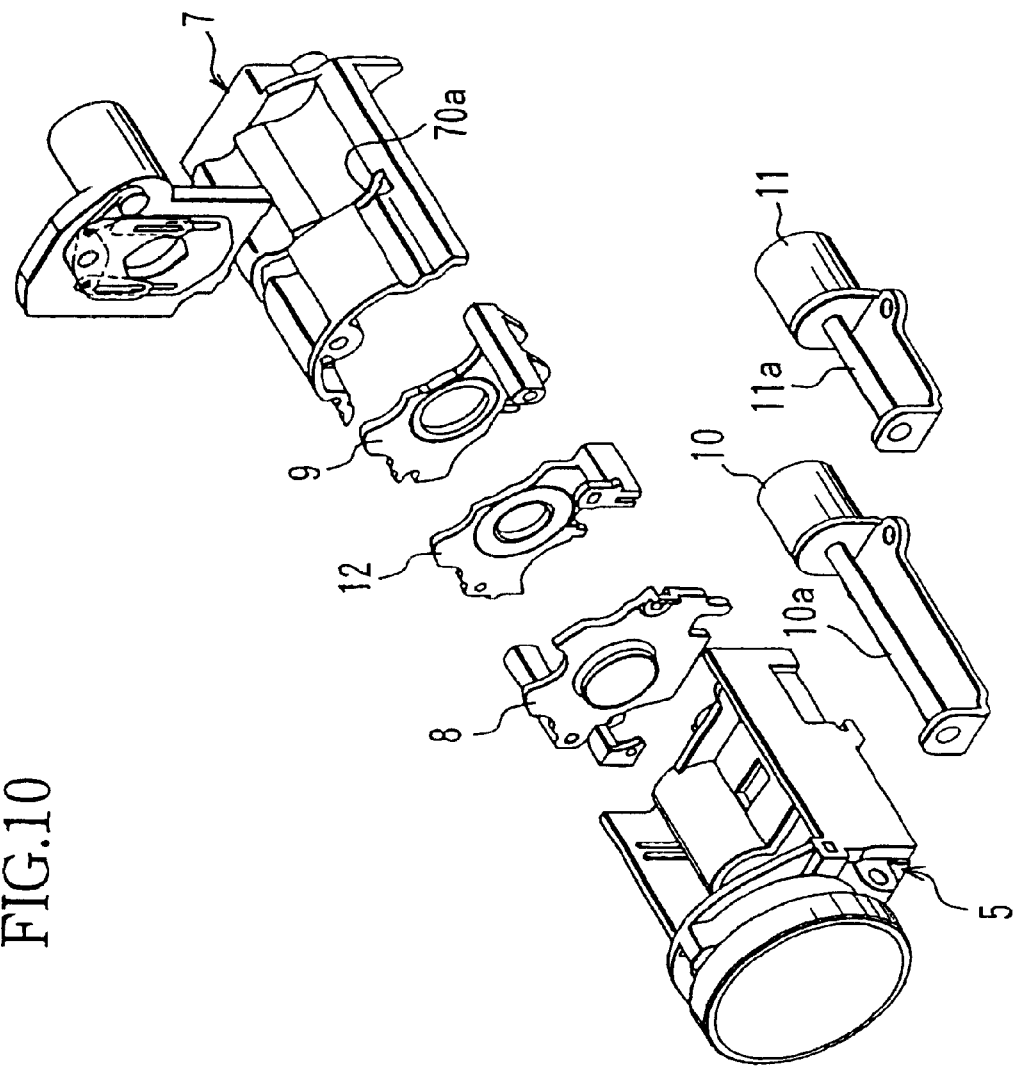
FIG. 10 is an exploded perspective view of a lens housing according to Embodiment 2 of the invention.

A lens housing according to the second embodiment of the invention is described below with reference to a perspective view shown in FIG. 10. In FIG. 10, identical numerals to the above-mentioned first embodiment indicate identical components, and hence a description is omitted. In the present embodiment, a rear barrel 7 is provided with an attachment hole 70a for attaching an IG meter 13 serving as an iris unit, whereby the IG meter 13 is attached in the attachment hole 70a.

(Third Embodiment)

Figure 11:
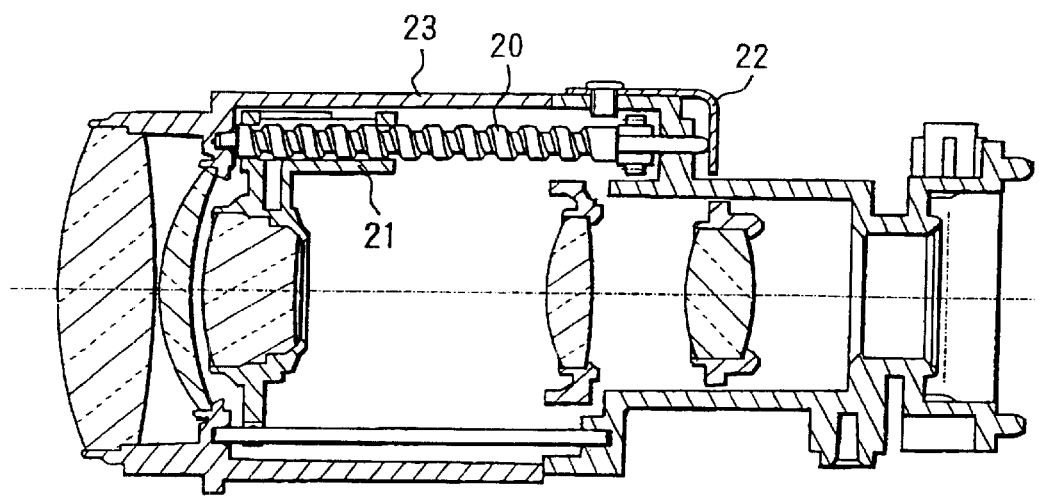
FIG. 11 shows the comparison between Embodiment 3 of the invention and the prior art.
Figure 11:
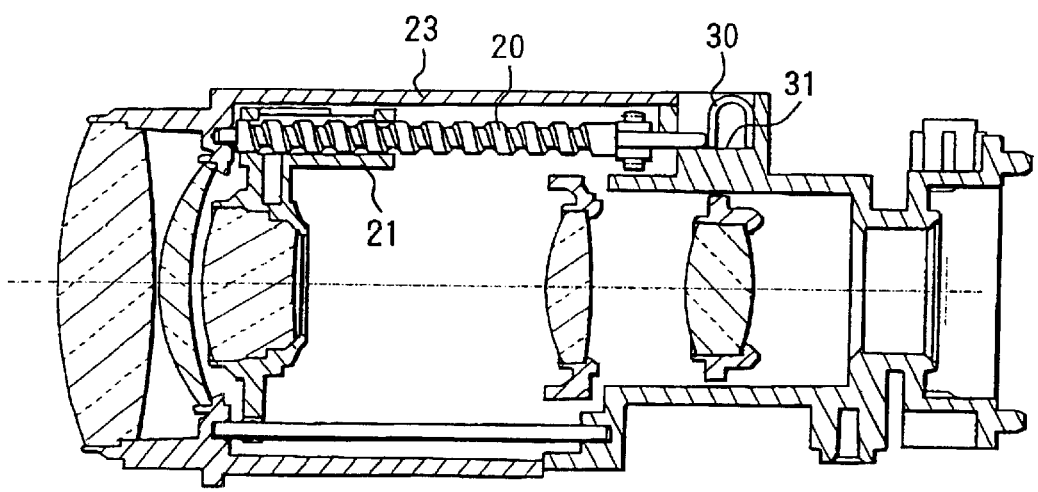
Figure 12:
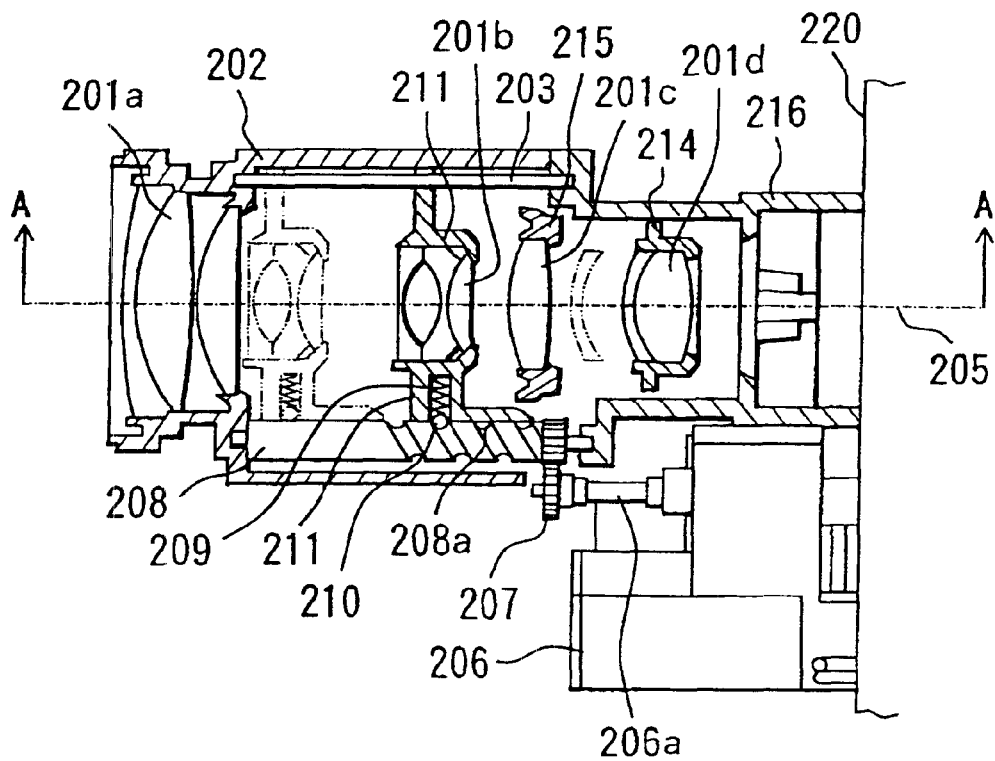
FIG. 12 shows vertical cross sectional views of the configuration of a zoom lens barrel according to the prior art.
Figure 12:
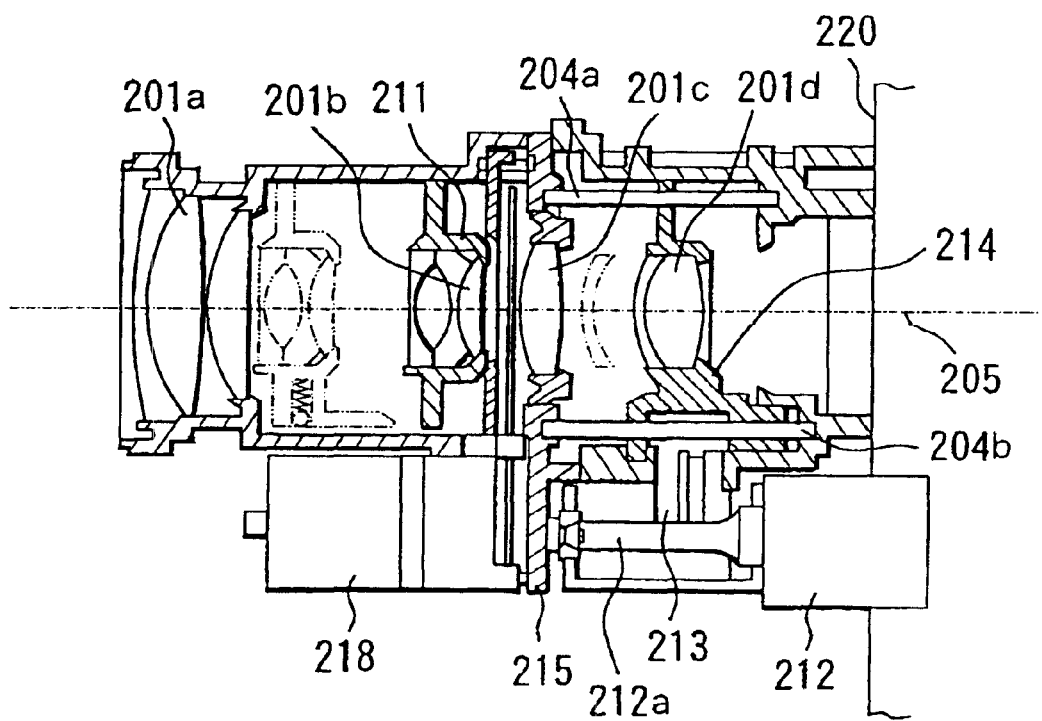
Figure 13:
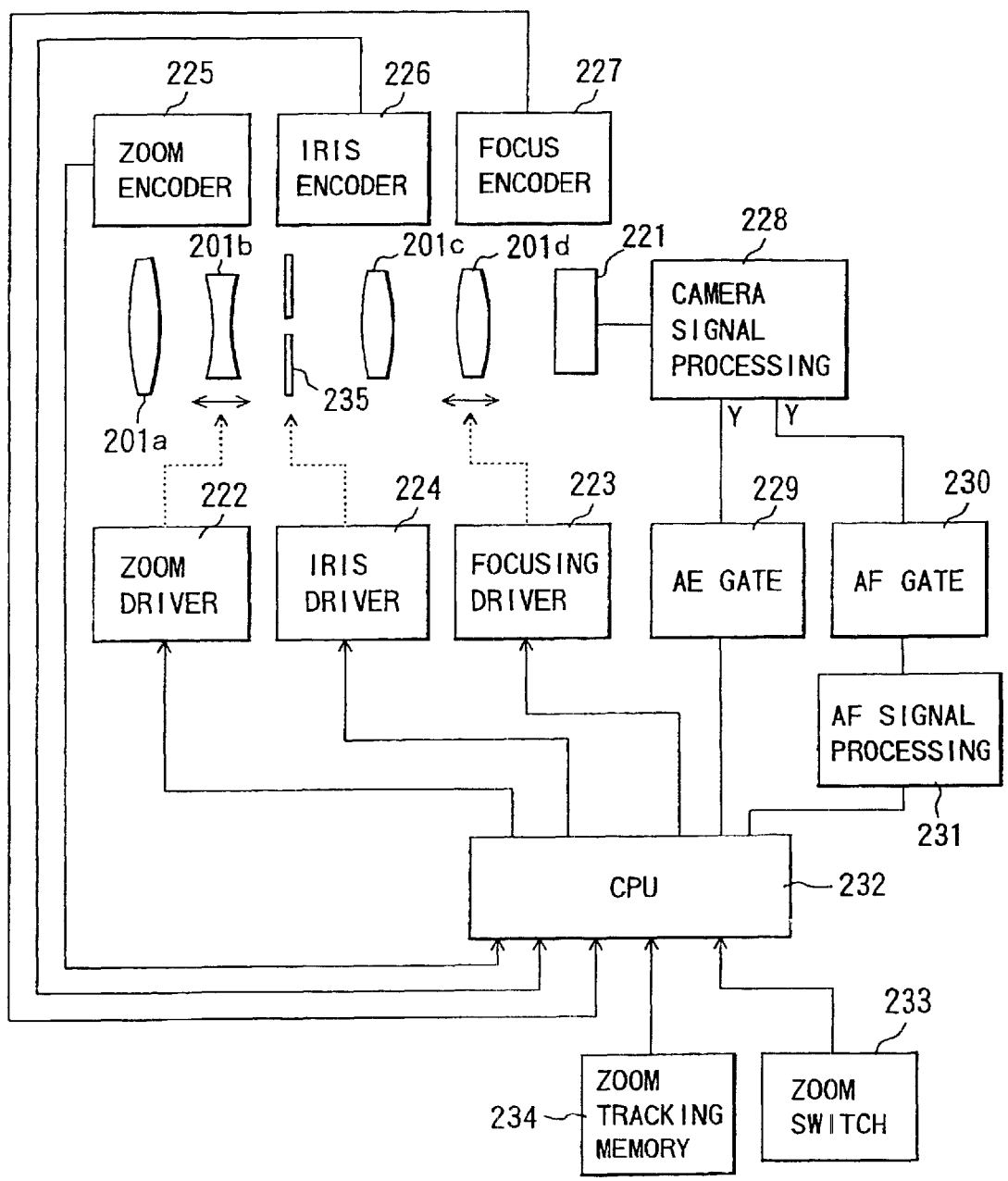
FIG. 13 is a block diagram showing the electrical configuration of an imaging apparatus according to the prior art.

Further, the third embodiment of the invention is described below with reference to FIG. 11. FIG. 11 shows the third embodiment in which a support hole is formed in a prior art lens barrel similarly to the guide support holes 5g and 5h of the guide shafts 6a and 6b, respectively, according to the invention shown in FIG. 2 and FIG. 4.

In the lens driving mechanism of the zoom lens, a guide shaft 20 serves as a drive screw, whereby the revolution of the guide shaft 20 is converted into movement of a moving ring 21 in the direction of the optical axis. Accordingly, any looseness in the guide shaft 20 in the direction of the optical axis causes defocusing.

In order to avoid looseness, the guide shaft needs to be enforced continuously in the one side of the direction of the optical axis. In the prior art, an enforcing flat spring 22 for this purpose has been disposed outside the lens barrel as shown in FIG. 11(A). This has caused the problem of leakage of lubricant grease and the like. In contrast, in the present embodiment shown in FIG. 11(B), a slide hole 31 having a space for containing a flat spring 30 is formed by the right and left slide motion of a mold used in the injection molding process. Finally, seal tape (not shown) is applied over the space. This configuration has the advantage of not allowing dusts to enter and to prevent leakage of grease. This slide hole 31 is the abovementioned hole formed similar to the guide support holes 5g and 5h formed in the slide holes 5c and 5d, respectively, as shown in FIG. 2 and FIG. 4.

In the above-mentioned embodiments, the lens barrel section serving as a lens barrel body is divided into first and second housings along the optical axis. By virtue of this, the movable lens component frames and the fixed lens component frames to be enclosed can be easily built-in from above the housing. This increases the degree of freedom in assembling.

Further, according to the above-mentioned embodiments, the outer diameter of the lens barrels can be reduced without causing undesired inner wall reflection ghosts.

Furthermore, according to the above-mentioned embodiments, the guide shafts are securely fixed to the front lens barrel and the rear barrel. This configuration resolves such a prior art problem wherein an insufficient fixture causes a resonance with the vibration of the drive motors and thereby results in acoustic noise.

Further, in an above-mentioned embodiment, a seal tape is applied over the space for containing an elastic member after installation of the elastic member. This avoids the problems of the dust entering, leakage of grease, and the like.

What is claimed is:

1. A lens barrel comprising:

a lens unit having an optical axis and forming an optical image, said lens unit having a fixed lens component and a movable lens component; and a lens housing for containing said lens unit, said lens housing having a first housing and a second housing divided in a direction along said optical axis;

wherein:

said first housing has a lens-holding portion for holding said fixed lens component; and said second housing has a pickup-device holding portion for holding an image pickup device for taking said optical image obtained by said lens unit.

2. A lens barrel according to claim 1, wherein at least one of said first housing and said second housing has a blocking section for blocking the reflection of unnecessary light toward the image side.

3. A lens barrel according to claim 1, wherein:

said lens barrel further comprises an actuator for moving said movable lens component in the direction of said optical axis; and said actuator is held in either said first housing or said second housing.

4. A lens barrel according to claim 1, wherein:

said lens unit further comprises a light amount control unit; and said light amount control unit is held in either said first housing or said second housing.

5. A lens barrel comprising:

a lens unit having an optical axis and forming an optical image, said lens unit having: a plurality of fixed lens components including a front fixed lens component disposed on the most object side; and a plurality of movable lens components; and a lens housing for containing said lens unit, said lens housing having a first housing and a second housing divided in a direction along said optical axis;

wherein:

in the front portion of said first housing, said first housing has a flange into which said front fixed lens component is fixed;

inside said first housing, said first housing has a lens-holding portion for holding said fixed lens component other than said front fixed lens component; and said second housing has a pickup-device holding portion for holding an image pickup device for taking said optical image obtained by said lens unit.

6. A lens barrel according to claim 5, wherein at least one of said first housing and said second housing has a blocking section for blocking the reflection of unnecessary light toward the image side.

7. A lens barrel according to claim 5 wherein:

said lens barrel further comprises a plurality of actuators each for moving each of said movable lens components in the direction of said optical axis; and said actuators are held in either said first housing or said second housing.

8. A lens barrel according to claim 5, wherein:

said lens barrel further comprises a plurality of actuators each for moving each of said movable lens components in the direction of said optical axis; and said actuators are held in said first housing and said second housing, respectively.

9. A lens barrel according to claim 5, wherein:

said lens unit further comprises a light amount control unit; and said light amount control unit is held in either said first housing or said second housing.

10. A lens barrel comprising:

a lens unit having an optical axis and forming an optical image, said lens unit having: a plurality of fixed lens components including a front fixed lens component disposed on the most object side; a plurality of movable lens components; and a guide bar for guiding said movable lens components and for forming said fixed lens component other than said front fixed lens component; and a lens housing for containing said lens unit, said lens housing having a first housing and a second housing divided in a direction along said optical axis;

wherein:

in the most front portion of said first housing, said first housing has a flange into which said front fixed lens component is fixed;

inside said first housing, said first housing has: a first guide-bar supporting portion for supporting said guide bar; and a lens-holding portion for holding said fixed lens component other than said front fixed lens component; and said second housing has: a second guide-bar supporting portion for supporting said guide bar; and a pickup-device holding portion for holding an image pickup device for taking said optical image obtained by said lens unit.

11. A lens barrel according to claim 10, wherein at least one of said first housing and said second housing has a blocking section for blocking the reflection of unnecessary light toward the image side.

12. A lens barrel according to claim 10, wherein:

said lens barrel further comprises a plurality of actuators each for moving each of said movable lens components in the direction of said optical axis; and said actuators are held in either said first housing or said second housing.

13. A lens barrel according to claim 10, wherein:

said lens barrel further comprises a plurality of actuators each for moving each of said movable lens components in the direction of said optical axis; and said actuators are held in said first housing and said second housing, respectively.

14. A lens barrel according to claim 10 wherein:

said lens unit further comprises a light amount control unit; and said light amount control unit is held in either said first housing or said second housing.

15. An optical apparatus with a lens barrel comprising:

a lens unit having an optical axis and forming an optical image, said lens unit having a fixed lens component and a movable lens component;

an image pickup device for taking said optical image obtained by said lens unit; and a lens housing for containing said lens unit, said lens housing having a first housing and a second housing divided in a direction along said optical axis;

wherein:

said first housing has a lens-holding portion for holding said fixed lens component; and said second housing has a pickup-device holding portion for holding said image pickup device.

16. An optical apparatus according to claim 15, wherein at least one of said first housing and said second housing has a blocking section for blocking the reflection of unnecessary light toward the image side.

17. An optical apparatus according to claim 15, wherein:

said optical apparatus further comprises an actuator for moving said movable lens component in the direction of said optical axis; and said actuator is held in either said first housing or said second housing.

18. An optical apparatus according to claim 15, wherein:

said lens unit further comprises a light amount control unit; and said light amount control unit is held in either said first housing or said second housing.

19. An optical apparatus with a lens barrel comprising:

a lens unit having an optical axis and forming an optical image, said lens unit having: a plurality of fixed lens components including a front fixed lens component disposed on the most object side; and a plurality of movable lens components;

an image pickup device for taking said optical image obtained by said lens unit; and a lens housing for containing said lens unit, said lens housing having a first housing and a second housing divided in a direction along said optical axis;

wherein:

in the most front portion of said first housing, said first housing has a flange into which said front fixed lens component is fixed;

inside said first housing, said first housing has a lens-holding portion for holding said fixed lens component other than said front fixed lens component; and said second housing has a pickup-device holding portion for holding said image pickup device.

20. An optical apparatus according to claim 19, wherein at least one of said first housing and said second housing has a blocking section for blocking the reflection of unnecessary light toward the image side.

21. An optical apparatus according to claim 19, wherein:

said optical apparatus further comprises a plurality of actuators each for moving each of said movable lens components in the direction of said optical axis; and said actuators are held in either said first housing or said second housing.

22. An optical apparatus according to claim 19, wherein:

said optical apparatus further comprises a plurality of actuators each for moving each of said movable lens components in the direction of said optical axis; and said actuators are held in said first housing and said second housing, respectively.

23. An optical apparatus according to claim 19, wherein:

said lens unit further comprises a light amount control unit; and said light amount control unit is held in either said first housing or said second housing.

24. An optical apparatus with a lens barrel comprising:

a lens unit having an optical axis and forming an optical image, said lens unit having: a plurality of fixed lens components including a front fixed lens component disposed on the most object side; a plurality of movable lens components; and a guide bar for guiding said movable lens components and for positioning said fixed lens component other than said front fixed lens component; and an image pickup device for taking said optical image obtained by said lens unit; and a lens housing for containing said lens unit, said lens housing having a first housing and a second housing divided in a direction along said optical axis;

wherein:

in the most front portion of said first housing, said first housing has a flange into which said front fixed lens component is fixed;

inside said first housing, said first housing has: a first guide-bar supporting portion for supporting said guide bar; and a lens-holding portion for holding said fixed lens component other than said front fixed lens component; and said second housing has: a second guide-bar supporting portion for supporting said guide bar; and a pickup-device holding portion for holding said image pickup device.

25. An optical apparatus according to claim 24, wherein at least one of said first housing and said second housing has a blocking section for blocking the reflection of unnecessary light toward the image side.

26. An optical apparatus according to claim 24, wherein:

said optical apparatus further comprises a plurality of actuators each for moving each of said movable lens components in the direction of said optical axis; and said actuators are held in either said first housing or said second housing.

27. An optical apparatus according to claim 24, wherein:

said optical apparatus further comprises a plurality of actuators each for moving each of said movable lens components in the direction of said optical axis; and said actuators are held in said first housing and said second housing, respectively.

28. An optical apparatus according to claim 24, wherein:

said lens unit further comprises a light amount control unit; and said light amount control unit is held in either said first housing or said second housing.

* * * * *

UNITED STATES PATENT AND TRADEMARK OFFICE
CERTIFICATE OF CORRECTION

PATENT NO. : 6,654,182 B2
DATED : November 25, 2003
INVENTOR(S) : Masae Miyakawa It is certified that error appears in the above-identified patent and that said Letters Patent is hereby corrected as shown below:

Column 1,
Line 22, "compornent" should read -- component --.

Column 5,
Line 9, "bar:" should read -- bar; --.

Column 8,
Line 64, "holodng" should read -- holding --.

Signed and Sealed this

Fifteenth Day of June, 2004

JON W. DUDAS
*Acting Director of the United States Patent and Trademark Office*